United States Patent [19]

Mills

[11] Patent Number: 4,900,499
[45] Date of Patent: Feb. 13, 1990

[54] MOLDING PROCESS FOR FORMING A TAPE OF LONG REINFORCEMENT

[75] Inventor: Stuart D. Mills, Bartlesville, Okla.

[73] Assignee: Phillips Petroleum Company, Bartlesville, Okla.

[21] Appl. No.: 144,298

[22] Filed: Jan. 14, 1988

[51] Int. Cl.$^4$ .................. B29C 41/24; B29C 41/36
[52] U.S. Cl. .................... 264/257; 264/136; 156/180; 156/441; 425/114
[58] Field of Search .............. 264/136, 137, 257; 156/180, 441, 181, 245; 425/113, 114, 115, 116

[56] References Cited

U.S. PATENT DOCUMENTS 4,445,957  5/1984  Harvey ........................... 156/180
4,680,224  7/1987  O'Conner ........................ 428/294

FOREIGN PATENT DOCUMENTS 0125472  11/1984  European Pat. Off. ............ 264/136

Primary Examiner—Jay H. Woo
Assistant Examiner—Jeremiah F. Durkin
Attorney, Agent, or Firm—Richmond, Phillips Hitchcock & Umphlett

[57] ABSTRACT

A process of forming a tape of long reinforcement in a continuous thermoplastic matrix. A roving of long fibers carrying a thermoplastic resin is introduced into the inlet of a wedgeshaped passage between the tongue and the groove of a tongue-in-groove die. The fibers are bounded by sidewalls for the entire length of the die. Both heat and pressure is applied to consolidate the resin in the fibers while the pressure is adjusted on the rovings by adjusting the inlet and the outlet clearances while the roving is being pulled through the die.

8 Claims, 1 Drawing Sheet

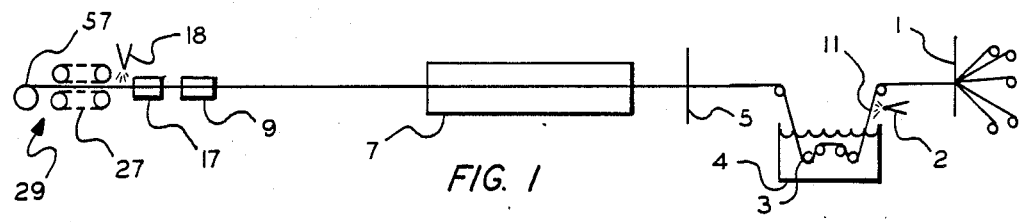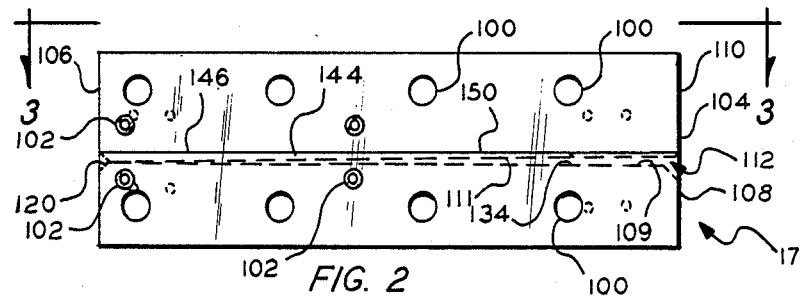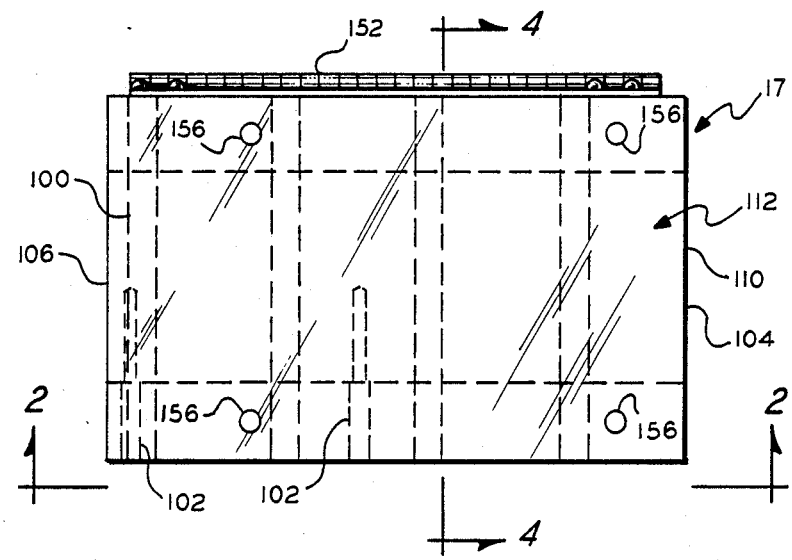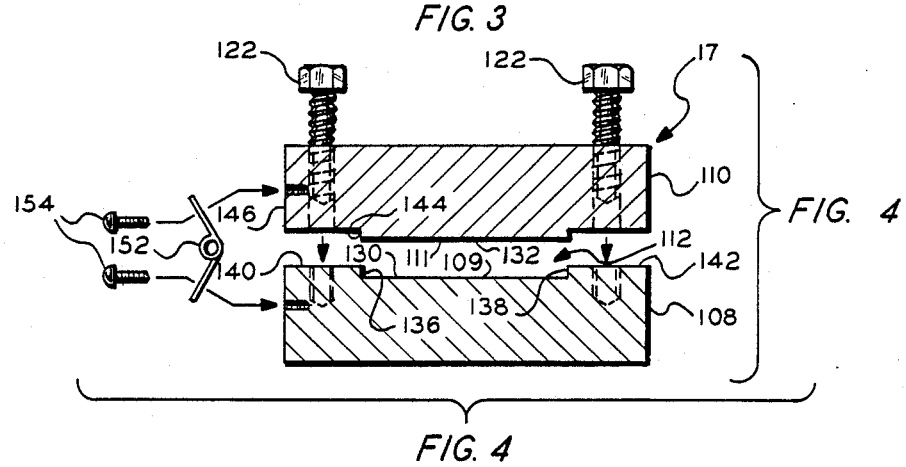

MOLDING PROCESS FOR FORMING A TAPE OF LONG REINFORCEMENT

BACKGROUND OF THE INVENTION

In one aspect, this invention relates to a die formed from two mold halves. In another aspect, the invention relates to a method for producing a tape containing reinforcing fibers in a continuous thermoplastic matrix.

A process for preparing shaped objects of continuous fiber strand material in a poly(arylene sulfide) matrix is disclosed in U.S. Pat. No. 4,680,224, issued July 14, 1987 to James E. O'Connor. Dies for producing tapes or strips are shown in FIGS. 3, 4 and 5 of this patent. The present invention provides an improved die design for producing tapes or strips which can be usefully employed in a process of the general type disclosed in this patent.

OBJECTS OF THE INVENTION

It is an object of this invention to provide a new die for forming tapes or strips containing unidirectional fiber reinforcement in a continuous thermoplastic matrix.

It is another object of this invention to provide a process for forming a tape or strip containing long fiber reinforcement in a continuous thermoplastic matrix.

SUMMARY OF THE INVENTION

In one embodiment of the invention, there is provided a tongue-in-groove die for consolidating a thermoplastic tape. The die has a first end and a second end and comprises a first mold half having a groove and a second mold half having a tongue to match the groove in the first die half. The second mold half is juxtaposed with respect to the first mold half and a wedge shaped passage is defined between the tongue and the groove which extends at least partially through the die from the first end to the second end of the die. The passage defined between the two mold halves converges from the first end of the die to the second end of the die. By providing a tongue-in-groove die, the width of the tape produced can be precisely controlled and requisite high pressures applied to the tape during the consolidation process. By forming the die halves with near zero clearance at the outlet end, consolidation pressure can be adjusted to achieve good wetout of fiber and formation of tape over varying feed rates of fiber and/or resin.

In another aspect of the invention, there is provided a process for forming a tape comprising long fiber reinforcement in a continuous thermoplastic matrix. According to the process, there is provided at least one roving of long fibers carrying a dispersion of the desired thermoplastic. The at least one roving is introduced into an inlet of a converging wedge-shaped passage defined between a tongue and a groove and which converges from the inlet to an outlet and is bounded by sidewalls for the entire length of the groove. The sidewalls are separated by a predetermined distance desired to be replicated in the tape. Sufficient heat and pressure is applied to the roving carrying the dispersion while in the wedge-shaped passage to consolidate the thermoplastic and form the tape which comprises the long fiber reinforcement in the continuous thermoplastic matrix. The inventive process provides for better consolidation of product over a wider range of input variables than was possible using the apparatus of the prior art.

BRIEF DESCRIPTION OF THE DRAWINGS

FIG. 1 schematically illustrates a process into which the present invention can be incorporated.

FIG. 2 is a side view of a die according to one embodiment of the present invention illustrating the passage through the die in dashed lines.

FIG. 3 is a plan view of the die illustrated in FIG. 2 when viewed along the indicated lines.

FIG. 4 is a cross-sectional exploded view of the die as shown in FIG. 3 as would be seen when viewed along the indicated lines.

DETAILED DESCRIPTION OF THE INVENTION

In FIG. 1, at least one roving or strand, preferably a multiplicity of strands, are passed through roving guide 1 and optionally past spray nozzle 2. A flow of gaseous fluid is emitted from the nozzle 2 to contact with the strand material with sufficient velocity to spread strands so that single filaments or bundles of single filaments are separated providing space therebetween so that subsequent contact with polymer slurry can be more effective. For the purpose of this invention, air is adequate as the gaseous fluid. Each strand is passed around several redirect bars 3 which cause the spreading of the fiber strands in the bath 4 which contains an aqueous slurry of thermoplastic particles in slurry form so that individual filaments will have better contact with the polymer particles. Alternatively, the contact can be with particles in the form of a dry powder.

Impregnated fiber strands are then pulled through a guide mechanism 5 for alignment for passage through optional heated drying chamber 7 to remove the slurry diluent where slurry impregnation has been used to provide a dry strand or multiplicity of strands carrying a dispersion of polymer which is then pulled through optional preheating chamber 9 and introduced in the heated die 17 having a construction according to the invention.

The rovings or strands with the dispersed thermoplastic resin become consolidated in the die 17 and are withdrawn from the die 17 by a pulling means 29 such as a gripping, pulling mechanism 27 of the type commonly used in pultrusion processes or a rotating mandrel 57 upon which the material could be spooled or which could be utilized to filament wind a fiber reinforced hollow thermoplastic object. Where the mandrel 57 carries a spool, the material taken up is usually referred to as a prepreg which can be cut, stacked and compression molded together to form multi-layer laminates of great structural strength.

Suitable thermoplastic resins useful for forming the continuous thermoplastic matrix are well-known. For example, polyolefins such as polypropylene can be used. Polyesters, polycarbonates, and polyamides such as NYLON® can also be used. High performance thermoplastics, the so-called engineering plastics, such as polyether-ether ketone (PEEK), and polyetherimide (such as ULTEM®), polyphenylene diketone (PPDK), and liquid crystal polymers are even more suitable. The preferred thermoplastic resins for use as the matrix material in accordance with the invention are selected from the family of aromatic sulfide polymers from the poly(arylene sulfide) (PAS) family. Poly(arylene sulfide) have the general formula $(AR-X-AR-S)_n$. The AR represents an aromatic unit which may be a mono or polycyclic moiety and X may be selected from at least one of the groups O, S, SO2, CO, OCO, NCHO, etc. The PAS polymers are noted for their excellent chemical resistance, good thermostability, and physical strength. Poly(phenylene sulfide), which consists of a polymer backbone of alternating aromatic rings and divalent sulfur atoms has been used with good results. One type of suitable poly(phenylene sulfide) is a commercial engineering thermoplastic resin that is semicrystalline in nature with a glass transition temperature of about 85° C. and a crystalline melting point of about 285° C. sold under the trademark RYTON ® PPS by Phillips 66 company of Bartlesville, Okla.

The fiber reinforcement suitable for use in the present invention can be selected from a wide variety of materials. The only constraint is that the fiber must not decompose prior to reaching the processing temperature for the resin selected as the matrix material. For poly(arylene sulfide) resins, glass fibers, carbon fibers, and aramid fibers such as KEVLAR ® fibers are most preferred. Continuous length fibers in the form of a roving are preferred.

The particle size of the thermoplastic resin in the slurry bath 4 will usually be on the order of the diameter of the individual filaments in the roving 11 passing through the bath. The slurry liquid is preferably water. For many applications, the individual particle size in the slurry will be principally 20 microns or less. Surfactant and agitation are used to maintain uniform particle concentration in the slurry. Makeup slurry is preferably added to maintain a uniform amount of particle pickup by the fiber rovings. Generally speaking, the feed to the die 17 will generally contain on the order of from about 30 to about 80 wt. % of reinforcing filaments, the remainder of the feed being the thermoplastic matrix material, generally in the form of a dispersion of particles carried by the roving material. Preferably, the die 17 comprises a heated die which is generally maintained at a temperature in the range of from about 310° C. to about 540° C., usually at a temperature in the range of from about 310° C. to about 400° C.. Functionally speaking, the die will be maintained at a temperature which is sufficient, at the pressures found within the die, to soften the polymer sufficiently to wetout the reinforcing fibers and form a continuous thermoplastic matrix having no visible voids or splits. Usually, the die will be maintained at a temperature in the range of from about 10° C. to about 100° C. above the softening point of the polymer selected.

With reference to FIG. 2, the die can be heated by inserting electrical resistance heaters through one or more transverse passages 100 extending through the die 17. In the embodiment of the invention shown in the drawings, 500 watt Wattlow "fire rod" heaters, 5 inches long by ⅜ inch outside diameter, are employed four each in the top and bottom parts of the die, which has exterior dimensions of about 5 inches by 7 inches by 3 inches and is formed from AISI H13 alloy steel. Line speed through the die generally ranges from about 0.001 to about 10 meters/second, usually in the range of from about 0.002 to about 0.5 meters/second. Residence time in the die 17 generally ranges from about 0.03 seconds up to about 30 seconds and varies with the cross-section of the article and the softening point of the resin employed. The die has a sufficiently high temperature to soften the thermoplastic dispersion and matrix and a sufficiently small passage through it to consolidate the dispersion into the shaped structure. Preferably, the shaped structure exiting the die is cooled such as a by a cooling means 18, for example, one or more air spargers, so that the cross-sectional configuration of the passage through the die is replicated in the product taken up on mandrel 57. The temperature in the die can be determined by thermocouples inserted into transverse bores 102 extending transversely part way through the die.

Referring now to FIGS. 2 through 4, a tongue-in-groove die 17 having a first end 104 and a second end 106 comprises a first mold half 108 having a groove 109 and a second mold half 110 having a tongue 111 to match the groove 109 in the first mold half 108. The second mold half 110 is juxtaposed with respect to the first mold half 108 and a wedge-shaped passage 112 is defined between the tongue 111 and the groove 109. The passage 112 has a longitudinal axis and extends at least partly through the die 17 converging from the first end 104 to the second end 106. The outlet 120 of the passage 112 through the die 17 is located near the second end 106 of the die and is generally near zero clearance. In a preferred embodiment, the outlet 120 can be adjusted to zero clearance by screws 122 when material is not present in the passage 112. It is contemplated that good results can be obtained when using the invention to make strips having a thickness in the range of from about 0.002 inches up to about 0.2 inches and a width such that the width to thickness ratio of the strip is at least 10 by employing a die which is adjustable at the outlet 120 to a dimension which is less than the nominal desired thickness of the strip. For example, in the production of strip 3 inches wide by approximately 0.007 inches thick an adjustable die to provide for an outlet gap 120 ranging from about zero to about 0.005 inches would be expected to provide good results. The mold half 108 and 110 can be chamfered at the inlet and outlet ends of the passage 112 if desired, for safety and reliable feeding of the material.

The first mold half 108 has a rectangular mold surface 130 forming the bottom of the groove 109. The second mold half 110 has a generally rectangular mold surface 132 on the top of the tongue 111. These rectangular surfaces are illustrated by the dashed lines in FIG. 3 and each has a major axis and a minor axis, the major axis being defined as the axis which extends between the ends of the die 17. The rectangular surfaces 130 and 132 determine first and second sides of the wedge-shaped passage 112 in the preferred embodiment of the invention. Preferably, the passage is symmetric so that the major axis of the rectangular surface 130 of the first die half, the major axis of the rectangular surface 132 of the second die half and the longitudinal axis of the wedge-shaped passage 112 all lie in the same plane.

As best shown by the dashed lines in FIG. 2, the wedge-shaped passage 112 preferably has triangularly shaped sides 134 which, with reference to FIG. 4, are determined by portions 136 and 138 of the first mold half 108. The sides 134 are preferably formed by a pair of parallel wall portions 140 and 142 respectively protruding from the first mold half 108 and running parallel t the major axis of the rectangular surface of the first mold half 108. The rectangular mold surface 130 connects the parallel wall portions 140 and 142 to form the sidewalls of the groove 109.

In a preferred embodiment, the tongue 111 on the second mold half 110 is formed by a wedge-shaped ramp portion 144 as best shown by the dashed lines in FIG. 2. This wedge-shaped ramp portion protrudes from a base portion 146 and defines the rectangular mold surface 132 of the second mold half 110. The wedge-shaped ramp portion 144 has a width which corresponds to the minor axis of the rectangular mold surface 132 and the wedge-shaped ramp portion 144 is closely received between the parallel wall portion 140 and 142 of the first mold half 108. Preferably, each of the rectangular mold surfaces 130 and 132 form an acute angle with a parting line 150 of the die 17. Generally speaking, the rectangular surfaces 130 and 132 will converge toward each other at an angle which is generally less than about 1°. In an embodiment of the invention which has been used with good results, the rectangular surfaces converge toward each other from an inlet gap of about 0.040 inches to an outlet gap of zero clearance which is adjusted open during use to result in the production of tape having a thickness of about 0.006 inches.

The die halves 108 and 110 are retained together by at least one hinge 152 in a preferred embodiment of the invention which is secured to each of the die halves by screws 154. The inlet and outlet clearances of the passage 112 are independently adjusted during use of the apparatus to provide a well consolidated product visually free from voids and splits by screws 122 preferably positioned in pairs of bore holes 156 near the first end 104 and the second end 106 of the die 17. The screws 122 are removed and die halves swung apart on hinge 152 when cleaning of the die is required. A brass putty knife is used for cleaning in order to avoid scratching the surfaces of the die. It has also proved to be desirable to weld T handles and washers onto the bolts 122 to facilitate dismantling and reassembly of the die.

The apparatus of the invention is generally used by a process which comprises providing at least one roving of long fibers carrying a dispersion of the thermoplastic from any of several means to the die. Preferably, the roving is impregnated with particles of the resin by slurry technique although fluidized bed or electrostatic technique could be used as well or, alternatively, the roving could be drawn through a bath of molten polymer to provide the dispersion. The at least one roving carrying the dispersion of thermoplastic resin is introduced into an inlet of a converging wedge-shaped passage defined between a tongue and a groove which converges from the inlet to an outlet thereof and which is bounded by sidewalls for the entire length of the passage. These sidewalls defining the groove are separated by a predetermined distance. In the passage, sufficient heat and pressure is applied to the roving and the dispersion of the thermoplastic resin so that consolidation of the thermoplastic is effected. A tape or strip comprising the selected long fiber reinforcement in the continuous thermoplastic matrix is thus provided which can be optionally cooled and collected. The fibers in the tape can generally be characterized as unidirectional. To facilitate consolidation of the resin, the process further comprises adjusting the pressure on the roving and the dispersion of thermoplastic resin by urging the die halves closer together at the outlet end of the passage.

The clearance between the tongue and the groove at the outlet end of the passage is preferably adjustable to near 0, as determined visually, when the die is not in use.

That which is claimed is:

1. A process for forming a tape comprising long fiber reinforcement in a continuous thermoplastic matrix, said process comprising:
    providing at least one roving of long fibers carrying a dispersion of thermoplastic resin;
    introducing said at least one roving into an inlet of a converging wedge-shaped passage defined between the tongue and the groove of a tongue-in-groove die, which passage converges from the inlet to an outlet and is bounded by sidewalls for the entire length of the groove, said sidewalls being separated by a predetermined distance;
    pulling said at least one roving through said wedge-shaped passage of said tongue-in-groove die;
    applying sufficient heat and pressure in the wedge-shaped passage to the roving carrying the dispersion of the thermoplastic resin to consolidate the dispersion of the thermoplastic resin and form the tape comprising said long fiber reinforcement in said continuous thermolastic matrix; and
    adjusting the pressure on said roving and dispersion of thermoplastic resin by adjusting inlet and outlet clearances between the tongue and groove at said inlet and said outlet respectively while said roving is being pulled through said wedge-shaped passage.

2. A process as in claim 1 wherein the thermoplastic comprises a poly(arylene sulfide) polymer and the long fiber reinforcement is selected from the group consisting of glass fiber, carbon fiber and aramid fiber.

3. A process as in claim 2 wherein heat is applied at a temperature in the range of about 310° C. to about 540° C. and about 10° C. to about 100° C. above the softening point of the poly(arylene sulfide) polymer.

4. A process as in claim 3 wherein the roving and dispersion of thermoplastic is pulled into the die at a speed in the range of about 0.001 to about 10 meters/sec.

5. A process as in claim 2 wherein heat is applied at a temperature in the range of about 310° C. to about 400° C. to produce a tape having a width:thickness ratio of at least about 10.

6. A process as in claim 5 wherein heat is applied in the die over a residence time for the roving in the range of about 0.03 seconds up to about 30 seconds.

7. A process as in claim 2 wherein said inlet and outlet clearances are independently adjusted in said adjustment step.

8. A process as in claim 7 wherein said tongue-in-groove die has a first end at which said inlet is located and a second end at which said outlet is located, and wherein said inlet and outlet clearances are adjusted independently by use of screws positioned near each of said first and second ends of said tongue-in-groove die.

* * * * *